US009065846B2

(12) United States Patent
Mahaffey

(10) Patent No.: US 9,065,846 B2
(45) Date of Patent: *Jun. 23, 2015

(54) ANALYZING DATA GATHERED THROUGH DIFFERENT PROTOCOLS

(71) Applicant: Lookout, Inc., San Francisco, CA (US)

(72) Inventor: Kevin Mahaffey, San Francisco, CA (US)

(73) Assignee: LOOKOUT, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,901

(22) Filed: Jun. 17, 2013

(65) Prior Publication Data

US 2013/0283376 A1    Oct. 24, 2013

Related U.S. Application Data

(63) Continuation of application No. 13/284,248, filed on Oct. 28, 2011, now Pat. No. 8,505,095, which is a continuation of application No. 12/255,614, filed on Oct. 21, 2008, now Pat. No. 8,051,480.

(51) Int. Cl.

| H04L 29/06 | (2006.01) |
|---|---|
| H04W 12/10 | (2009.01) |
| G06F 11/00 | (2006.01) |
| G06F 12/14 | (2006.01) |
| G06F 12/16 | (2006.01) |
| G08B 23/00 | (2006.01) |
| G06F 1/00 | (2006.01) |

(52) U.S. Cl.
CPC ........... *H04L 63/1408* (2013.01); *H04W 12/10* (2013.01)

(58) Field of Classification Search
None
See application file for complete search history.

(56) References Cited

U.S. PATENT DOCUMENTS

| 3,416,032 A | 12/1968 | Jahns et al. |
| 4,553,257 A | 11/1985 | Mori et al. |

(Continued)

FOREIGN PATENT DOCUMENTS

| GB | 2430588 | 3/2007 |
| WO | 2007081356 | 7/2001 |

(Continued)

OTHER PUBLICATIONS

Richardson, Alexis, "Introduction to RabbitMQ", Google UK, available at http://www.rabbitmq.com/resources/google-tech-talk-final/alexis-google-rabbitmq-talk.pdf, retrieved on Mar. 30, 2012, 33 pages, published on Sep. 25, 2008.

(Continued)

*Primary Examiner* — Shin-Hon Chen
(74) *Attorney, Agent, or Firm* — Dergosits & Noah LLP

(57) ABSTRACT

A security analysis of data received on a mobile communications device includes gathering information about the data through at least two of multiple network interfaces, each of the at least two network interfaces having different protocols. Based upon the gathering, a first protocol is assigned to the data received from a first of the at least two network interfaces. A second protocol is assigned to the data received from a second of the at least two network interfaces. A common security analysis is performed on at least a part of the data received from each of the first and second network interfaces to determine whether the data received by the mobile communications device is safe or malicious.

25 Claims, 4 Drawing Sheets

(56) References Cited

U.S. PATENT DOCUMENTS

| | | | |
|---|---|---|---|
| 5,319,776 A | 6/1994 | Hile et al. | |
| 5,574,775 A | 11/1996 | Miller, II et al. | |
| 5,715,518 A | 2/1998 | Barrere et al. | |
| 6,185,689 B1 | 2/2001 | Todd et al. | |
| 6,269,456 B1 | 7/2001 | Hodges et al. | |
| 6,272,353 B1 | 8/2001 | Dicker et al. | |
| 6,301,668 B1 * | 10/2001 | Gleichauf et al. | 726/25 |
| 6,453,345 B2 | 9/2002 | Trcka et al. | |
| 6,529,143 B2 | 3/2003 | Mikkola et al. | |
| 6,696,941 B2 | 2/2004 | Baker | |
| 6,792,543 B2 | 9/2004 | Pak et al. | |
| 6,892,225 B1 | 5/2005 | Tu et al. | |
| 6,907,530 B2 | 6/2005 | Wang | |
| 6,959,184 B1 | 10/2005 | Byers et al. | |
| 7,020,895 B2 | 3/2006 | Albrecht | |
| 7,023,383 B2 | 4/2006 | Stilp et al. | |
| 7,069,589 B2 | 6/2006 | Schmall et al. | |
| 7,096,368 B2 | 8/2006 | Kouznetsov et al. | |
| 7,123,933 B2 | 10/2006 | Poor et al. | |
| 7,127,455 B2 | 10/2006 | Carson et al. | |
| 7,159,237 B2 | 1/2007 | Schneier et al. | |
| 7,171,690 B2 | 1/2007 | Kouznetsov et al. | |
| 7,178,166 B1 | 2/2007 | Taylor et al. | |
| 7,181,252 B2 | 2/2007 | Komsi | |
| 7,210,168 B2 | 4/2007 | Hursey et al. | |
| 7,228,566 B2 | 6/2007 | Caceres et al. | |
| 7,236,598 B2 | 6/2007 | Sheymov et al. | |
| 7,237,264 B1 | 6/2007 | Graham et al. | |
| 7,266,810 B2 | 9/2007 | Karkare et al. | |
| 7,290,276 B2 | 10/2007 | Ogata | |
| 7,304,570 B2 | 12/2007 | Thomas et al. | |
| 7,305,245 B2 | 12/2007 | Alizadeh-Shabdiz | |
| 7,308,256 B2 | 12/2007 | Morota et al. | |
| 7,308,712 B2 | 12/2007 | Banzhof | |
| 7,325,249 B2 | 1/2008 | Sutton et al. | |
| 7,356,835 B2 | 4/2008 | Gancarcik et al. | |
| 7,376,969 B1 | 5/2008 | Njemanze et al. | |
| 7,386,297 B2 | 6/2008 | An | |
| 7,392,043 B2 | 6/2008 | Kouznetsov et al. | |
| 7,392,543 B2 * | 6/2008 | Szor | 726/23 |
| 7,397,424 B2 | 7/2008 | Houri | |
| 7,397,434 B2 | 7/2008 | Mun et al. | |
| 7,401,359 B2 | 7/2008 | Gartside et al. | |
| 7,403,762 B2 | 7/2008 | Morgan et al. | |
| 7,414,988 B2 | 8/2008 | Jones et al. | |
| 7,415,270 B2 | 8/2008 | Wilhelmsson et al. | |
| 7,433,694 B2 | 10/2008 | Morgan et al. | |
| 7,440,408 B1 * | 10/2008 | Anderson | 370/252 |
| 7,467,206 B2 | 12/2008 | Moore et al. | |
| 7,471,954 B2 | 12/2008 | Brachet et al. | |
| 7,472,422 B1 | 12/2008 | Agbabian | |
| 7,474,897 B2 | 1/2009 | Morgan et al. | |
| 7,493,127 B2 | 2/2009 | Morgan et al. | |
| 7,502,620 B2 | 3/2009 | Morgan et al. | |
| 7,515,578 B2 | 4/2009 | Alizadeh-Shabdiz | |
| 7,525,541 B2 | 4/2009 | Chun et al. | |
| 7,551,579 B2 | 6/2009 | Alizadeh-Shabdiz | |
| 7,551,929 B2 | 6/2009 | Alizadeh-Shabdiz | |
| 7,634,800 B2 | 12/2009 | Ide et al. | |
| 7,685,132 B2 | 3/2010 | Hyman | |
| 7,696,923 B2 | 4/2010 | Houri | |
| 7,768,963 B2 | 8/2010 | Alizadeh-Shabdiz | |
| 7,769,396 B2 | 8/2010 | Alizadeh-Shabdiz et al. | |
| 7,774,637 B1 * | 8/2010 | Beddoe et al. | 714/38.1 |
| 7,783,281 B1 | 8/2010 | Cook et al. | |
| 7,809,353 B2 | 10/2010 | Brown et al. | |
| 7,809,366 B2 | 10/2010 | Rao et al. | |
| 7,818,017 B2 | 10/2010 | Alizadeh-Shabdiz et al. | |
| 7,835,754 B2 | 11/2010 | Alizadeh-Shabdiz et al. | |
| 7,856,234 B2 | 12/2010 | Alizadeh-Shabdiz et al. | |
| 7,856,373 B2 | 12/2010 | Ullah | |
| 7,861,303 B2 | 12/2010 | Kouznetsov et al. | |
| 7,907,966 B1 | 3/2011 | Mammen | |
| 7,916,661 B2 | 3/2011 | Alizadeh-Shabdiz et al. | |
| 7,991,854 B2 | 8/2011 | Bahl | |
| 7,999,742 B2 | 8/2011 | Alizadeh-Shabdiz et al. | |
| 8,014,788 B2 | 9/2011 | Alizadeh-Shabdiz et al. | |
| 8,019,357 B2 | 9/2011 | Alizadeh-Shabdiz et al. | |
| 8,031,657 B2 | 10/2011 | Jones et al. | |
| 8,046,502 B2 * | 10/2011 | Kim et al. | 710/11 |
| 8,051,480 B2 * | 11/2011 | Mahaffey | 726/22 |
| 8,054,219 B2 | 11/2011 | Alizadeh-Shabdiz | |
| 8,087,082 B2 | 12/2011 | Bloch et al. | |
| 8,089,398 B2 | 1/2012 | Alizadeh-Shabdiz | |
| 8,089,399 B2 | 1/2012 | Alizadeh-Shabdiz | |
| 8,090,386 B2 | 1/2012 | Alizadeh-Shabdiz | |
| 8,108,555 B2 | 1/2012 | Awadallah et al. | |
| 8,121,617 B1 | 2/2012 | LaGrotta et al. | |
| 8,126,456 B2 | 2/2012 | Lotter et al. | |
| 8,127,358 B1 | 2/2012 | Lee | |
| 8,135,395 B2 | 3/2012 | Cassett et al. | |
| 8,195,196 B2 | 6/2012 | Haran et al. | |
| 8,259,568 B2 | 9/2012 | Laudermilch et al. | |
| 8,261,351 B1 | 9/2012 | Thornewell et al. | |
| 8,266,288 B2 | 9/2012 | Banerjee et al. | |
| 8,266,324 B2 | 9/2012 | Baratakke et al. | |
| 8,346,860 B2 | 1/2013 | Berg et al. | |
| 8,356,080 B2 | 1/2013 | Luna et al. | |
| 8,364,785 B2 | 1/2013 | Plamondon | |
| 2001/0044339 A1 | 11/2001 | Cordero et al. | |
| 2002/0042886 A1 | 4/2002 | Lahti et al. | |
| 2002/0087483 A1 | 7/2002 | Harif | |
| 2002/0108058 A1 | 8/2002 | Iwamura | |
| 2002/0181416 A1 * | 12/2002 | Lee et al. | 370/327 |
| 2002/0183060 A1 * | 12/2002 | Ko et al. | 455/432 |
| 2002/0191018 A1 | 12/2002 | Broussard | |
| 2003/0028803 A1 | 2/2003 | Bunker et al. | |
| 2003/0046134 A1 | 3/2003 | Frolick et al. | |
| 2003/0061388 A1 * | 3/2003 | Cleghorn et al. | 709/246 |
| 2003/0079145 A1 | 4/2003 | Kouznetsov et al. | |
| 2003/0112178 A1 * | 6/2003 | Bajikar | 342/357.06 |
| 2003/0115485 A1 | 6/2003 | Milliken et al. | |
| 2003/0120951 A1 | 6/2003 | Gartside et al. | |
| 2003/0131148 A1 | 7/2003 | Kelley et al. | |
| 2004/0022258 A1 | 2/2004 | Tsukada et al. | |
| 2004/0025042 A1 | 2/2004 | Kouznetsov et al. | |
| 2004/0133624 A1 | 7/2004 | Park | |
| 2004/0158741 A1 | 8/2004 | Schneider | |
| 2004/0185900 A1 | 9/2004 | McElveen | |
| 2004/0209608 A1 | 10/2004 | Kouznetsov et al. | |
| 2004/0225887 A1 | 11/2004 | O'Neil et al. | |
| 2004/0259532 A1 * | 12/2004 | Isomaki et al. | 455/412.1 |
| 2005/0010821 A1 | 1/2005 | Cooper et al. | |
| 2005/0015443 A1 | 1/2005 | Levine et al. | |
| 2005/0074106 A1 | 4/2005 | Orlamunder et al. | |
| 2005/0076246 A1 | 4/2005 | Singhal | |
| 2005/0091308 A1 | 4/2005 | Bookman et al. | |
| 2005/0125779 A1 | 6/2005 | Kelley et al. | |
| 2005/0130627 A1 | 6/2005 | Calmels et al. | |
| 2005/0138395 A1 | 6/2005 | Benco et al. | |
| 2005/0138413 A1 | 6/2005 | Lippmann et al. | |
| 2005/0138450 A1 | 6/2005 | Hsieh | |
| 2005/0154796 A1 | 7/2005 | Forsyth | |
| 2005/0186954 A1 | 8/2005 | Kenney | |
| 2005/0197099 A1 | 9/2005 | Nehushtan | |
| 2005/0221800 A1 | 10/2005 | Jackson et al. | |
| 2005/0227669 A1 | 10/2005 | Haparnas | |
| 2005/0237970 A1 | 10/2005 | Inoue | |
| 2005/0240999 A1 | 10/2005 | Rubin et al. | |
| 2005/0254654 A1 | 11/2005 | Rockwell et al. | |
| 2005/0278777 A1 | 12/2005 | Loza | |
| 2005/0282533 A1 | 12/2005 | Draluk et al. | |
| 2006/0026283 A1 | 2/2006 | Trueba | |
| 2006/0028998 A1 * | 2/2006 | Lioy et al. | 370/252 |
| 2006/0073820 A1 | 4/2006 | Craswell et al. | |
| 2006/0075388 A1 | 4/2006 | Kelley et al. | |
| 2006/0080680 A1 | 4/2006 | Anwar et al. | |
| 2006/0084417 A1 * | 4/2006 | Melpignano et al. | 455/418 |
| 2006/0095454 A1 | 5/2006 | Shankar et al. | |
| 2006/0101518 A1 | 5/2006 | Schumaker et al. | |
| 2006/0130145 A1 * | 6/2006 | Choi et al. | 726/24 |
| 2006/0150238 A1 | 7/2006 | D'Agostino | |
| 2006/0150256 A1 | 7/2006 | Fanton et al. | |
| 2006/0179485 A1 | 8/2006 | Longsine et al. | |

(56) References Cited

U.S. PATENT DOCUMENTS

| | | |
|---|---|---|
| 2006/0217115 A1 | 9/2006 | Cassett et al. |
| 2006/0218482 A1 | 9/2006 | Ralston et al. |
| 2006/0224742 A1 | 10/2006 | Shahbazi |
| 2006/0236325 A1 | 10/2006 | Rao et al. |
| 2006/0253205 A1 | 11/2006 | Gardiner |
| 2006/0253584 A1 | 11/2006 | Dixon et al. |
| 2006/0272011 A1 | 11/2006 | Ide et al. |
| 2006/0277408 A1 | 12/2006 | Bhat et al. |
| 2006/0294582 A1 | 12/2006 | Linsley-Hood et al. |
| 2007/0005327 A1 | 1/2007 | Ferris |
| 2007/0011319 A1 | 1/2007 | McClure et al. |
| 2007/0015519 A1 | 1/2007 | Casey |
| 2007/0016953 A1 | 1/2007 | Morris et al. |
| 2007/0016955 A1 | 1/2007 | Goldberg et al. |
| 2007/0021112 A1 | 1/2007 | Byrne et al. |
| 2007/0028095 A1 | 2/2007 | Allen et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0050471 A1 | 3/2007 | Patel et al. |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0154014 A1 | 7/2007 | Aissi et al. |
| 2007/0174472 A1 | 7/2007 | Kulakowski |
| 2007/0174490 A1 | 7/2007 | Choi et al. |
| 2007/0186282 A1 | 8/2007 | Jenkins |
| 2007/0190995 A1 | 8/2007 | Wang et al. |
| 2007/0214504 A1* | 9/2007 | Milani Comparetti et al. . 726/23 |
| 2007/0220608 A1 | 9/2007 | Lahti et al. |
| 2007/0240127 A1 | 10/2007 | Roques et al. |
| 2007/0240218 A1 | 10/2007 | Tuvell et al. |
| 2007/0240221 A1 | 10/2007 | Tuvell et al. |
| 2007/0240222 A1* | 10/2007 | Tuvell et al. .................. 726/24 |
| 2007/0248047 A1 | 10/2007 | Shorty et al. |
| 2007/0250627 A1 | 10/2007 | May et al. |
| 2007/0293263 A1* | 12/2007 | Eslambolchi et al. ...... 455/552.1 |
| 2007/0297610 A1 | 12/2007 | Chen et al. |
| 2008/0028470 A1 | 1/2008 | Remington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1 | 2/2008 | Demirhan et al. |
| 2008/0065507 A1 | 3/2008 | Morrison et al. |
| 2008/0070495 A1 | 3/2008 | Stricklen et al. |
| 2008/0072329 A1 | 3/2008 | Herschaft |
| 2008/0086773 A1 | 4/2008 | Tuvell et al. |
| 2008/0086776 A1* | 4/2008 | Tuvell et al. .................. 726/24 |
| 2008/0109871 A1 | 5/2008 | Jacobs |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0186162 A1 | 8/2008 | Rajan et al. |
| 2008/0196104 A1 | 8/2008 | Tuvell et al. |
| 2008/0200160 A1 | 8/2008 | Fitzpatrick et al. |
| 2008/0208950 A1 | 8/2008 | Kim et al. |
| 2008/0209557 A1 | 8/2008 | Herley et al. |
| 2008/0235801 A1 | 9/2008 | Soderberg et al. |
| 2008/0237970 A1* | 10/2008 | Tanaka et al. .................. 271/109 |
| 2008/0276111 A1* | 11/2008 | Jacoby et al. .................. 713/340 |
| 2008/0293396 A1 | 11/2008 | Barnes et al. |
| 2008/0307243 A1 | 12/2008 | Lee |
| 2008/0318562 A1 | 12/2008 | Featherstone et al. |
| 2009/0172227 A1 | 7/2009 | Taylor et al. |
| 2009/0199298 A1 | 8/2009 | Miliefsky |
| 2009/0205016 A1 | 8/2009 | Milas |
| 2009/0205047 A1 | 8/2009 | Podjarny |
| 2009/0248623 A1 | 10/2009 | Adelman et al. |
| 2009/0293125 A1 | 11/2009 | Szor |
| 2010/0019731 A1 | 1/2010 | Connolly et al. |
| 2010/0064341 A1 | 3/2010 | Aldera |
| 2010/0097494 A1 | 4/2010 | Gum et al. |
| 2010/0100591 A1 | 4/2010 | Mahaffey et al. |
| 2010/0100939 A1 | 4/2010 | Mahaffey et al. |
| 2010/0100959 A1 | 4/2010 | Mahaffey |
| 2010/0100963 A1 | 4/2010 | Mahaffey et al. |
| 2010/0100964 A1 | 4/2010 | Mahaffey et al. |
| 2010/0154032 A1 | 6/2010 | Ollmann |
| 2010/0210240 A1 | 8/2010 | Mahaffey et al. |
| 2010/0240419 A1 | 9/2010 | Horino |
| 2010/0313270 A1 | 12/2010 | Kim et al. |
| 2010/0317324 A1 | 12/2010 | Brown et al. |
| 2010/0332593 A1 | 12/2010 | Barash et al. |
| 2011/0047033 A1 | 2/2011 | Mahaffey et al. |
| 2011/0047594 A1 | 2/2011 | Mahaffey et al. |
| 2011/0047597 A1 | 2/2011 | Mahaffey et al. |
| 2011/0047620 A1 | 2/2011 | Mahaffey et al. |
| 2011/0119765 A1 | 5/2011 | Hering et al. |
| 2011/0145920 A1 | 6/2011 | Mahaffey et al. |
| 2011/0171923 A1 | 7/2011 | Daly et al. |
| 2011/0241872 A1 | 10/2011 | Mahaffey |
| 2011/0296510 A1 | 12/2011 | Hatlelid et al. |
| 2012/0042382 A1 | 2/2012 | Mahaffey |
| 2012/0060222 A1 | 3/2012 | Mahaffey et al. |
| 2012/0072569 A1 | 3/2012 | Xu |
| 2012/0084836 A1 | 4/2012 | Mahaffey et al. |
| 2012/0084864 A1 | 4/2012 | Mahaffey et al. |
| 2012/0096555 A1 | 4/2012 | Mahaffey |
| 2012/0110174 A1 | 5/2012 | Wootton et al. |
| 2012/0124239 A1 | 5/2012 | Shribman et al. |
| 2012/0179801 A1 | 7/2012 | Luna et al. |
| 2012/0179814 A1 | 7/2012 | Swildens et al. |
| 2012/0188064 A1 | 7/2012 | Mahaffey et al. |
| 2012/0196571 A1 | 8/2012 | Grkov et al. |
| 2012/0233695 A1 | 9/2012 | Mahaffey et al. |
| 2012/0259954 A1 | 10/2012 | McCarthy et al. |
| 2012/0303735 A1 | 11/2012 | Raciborski et al. |
| 2012/0317233 A1 | 12/2012 | Redpath |
| 2012/0324076 A1 | 12/2012 | Zerr et al. |
| 2012/0324094 A1 | 12/2012 | Wyatt et al. |
| 2012/0324568 A1 | 12/2012 | Wyatt et al. |
| 2013/0019311 A1 | 1/2013 | Swildens et al. |
| 2013/0023209 A1 | 1/2013 | Fisher et al. |
| 2013/0041974 A1 | 2/2013 | Luna et al. |
| 2013/0047034 A1 | 2/2013 | Salomon et al. |
| 2013/0086682 A1 | 4/2013 | Mahaffey et al. |

FOREIGN PATENT DOCUMENTS

| | | |
|---|---|---|
| WO | 2005101789 | 10/2005 |
| WO | 2006110181 | 10/2006 |
| WO | 2008007111 | 1/2008 |
| WO | 2008057737 | 5/2008 |
| WO | 2010048218 | 4/2010 |
| WO | 2010048220 | 4/2010 |
| WO | 2012027588 | 1/2012 |

OTHER PUBLICATIONS

Fisher, Oliver, "Malware? We Don't Need No Stinking Malware!", Google, available at http://googlewebmastercentral.blogspot.com/2008/10/malware-we-dont-need-no-stinking.html, retrieved on Mar. 30, 2012, published on Oct. 24, 2008, 11 pages.

Reardon, Marguerite, "Mobile Phones That Track Your Buddies," Cnet, available at <http://news.cnet.com/Mobile-phones-that-track-your-buddies/2100-1039_3-6135209.html, retrieved Mar. 30, 2012, published on Nov. 14, 2006, 6 pages.

Fette, Ian "Understanding Phishing and Malware Protection in Google Chrome," The Chromium Blog, available at http://blog.chromium.org/2008_11_01_archive.html, retrieved on May 17, 2011, published on Nov. 14, 2008, 6 pages.

Kincaid, Jason "Urban Airship Brings Easy Push Notifications to Android," TechCrunch, available at http://techcrunch.com/2010/08/10/urban-airship-brings-easy-push-notifications-to-android/, retrieved on Jun. 16, 2011, published on Aug. 10, 2010, 5 pages.

(56) References Cited

OTHER PUBLICATIONS

Keane, Justin K. "Using the Google Safe Browsing API from PHP," Mad Irish, Aug. 7, 2009, available at http://www.madirish.net/node/245, retrieved Mar. 30, 2012, published on Aug. 7, 2009, 5 pages.

Jefferies, Charles P. "Webroot AntiVirus 2010 With Spy Sweeper Review," Notebook Review, available at http://www.notebookreview.com/defaultasp?newsID=5700&review=Webroot+AntiVirus+2010+With+Spy+Sweeper+Review, retrieved on May 18, 2011, published on Jun. 22, 2010, 3 pages.

"Berry Locator", available at http://www.mobireport.com/apps/bl/, retrieved on Aug. 10, 2011, published Feb. 8, 2008.

Wikipedia, "Firefox Browser", available at http://en.wikipedia.org/wiki/Firefox_browser, retrieved on Aug. 10, 2011, published on Dec. 15, 2005.

F-Secure, "F-Secure Mobile Security for S60 Users Guide", pp. 1-34, retrieved on Aug. 10, 2011, published on Jan. 26, 2009.

Wikipedia, "Java Virtual Machine", available at http://en.wikipedia.org/wiki/Java_virtual_machine, retrieved on Aug. 10, 2011, published on Dec. 9, 2003.

Kaspersky "Kaspersky Mobile Security", available at http://usa.kaspersky.com/products-services/home-computersecurity, published on Jan. 1, 2007, retrieved on Oct. 21, 2008.

"Kaspersky Mobile Security", Kaspersky Lab 2008, available at http://www.kaspersky.com/kaspersky_mobile_security, retrieved on Sep. 11, 2008, published on Jun. 22, 2010, 3 Pages.

Symantec, "Symantec Norton Smartphone Security", available at http://www.symantec.com/norton/smartphone_security, retrieved on Oct. 21, 2008, published on Jan. 1, 2007.

"PhoneBak PDA Phone Anti-theft software for your PDA phone", 2007, Bak2u Pte Ltd (Singapore) pp. 1-4.

"PhoneBak: Mobile Phone Theft Recovery Software", 2007, Westin Tech.

Symantec, "Symantec Endpoint Security, Data Sheet and Product Screen Shot", retrieved on Oct. 21, 2008, published on Jun. 15, 2008.

Symantec, "Symantec Mobile Security Suite for Windows Mobile, Data Sheet and Product Screen Shot", available at http://www.symantec.com/norton/smartphone_security, retrieved on Oct. 21, 2008, published on Mar. 1, 2008.

TippingPoint "TippingPoint Security Management System (SMS)", available at http://www.tippingpoint.com/products_sms.html, retrieved on Oct. 21, 2008, published on Mar. 31, 2005, 2 pages.

Summerson, Cameron "5 Android Antivirus Apps Compared, Find Out Which Ones Are Worth Having!," Android Headlines, available at http://androidheadlines.com/2011/03/5-android-antivirus-apps-comapred-find-out-which-onesare-worth-having.html, retrieved on Mar. 30, 2012, published on Mar. 8, 2011, 9 pages.

"Android Cloud to Device Messaging Framework," Google Code Labs, available at http://code.google.com/android/c2dm/, retrieved on Sep. 14, 2011, published on Apr. 11, 2011, 9 pages.

"BlackBerry Push Service Overview," available at http://us.blackberry.com/developers/platform/pushapi.jsp#tab_tab_resources, retrieved on Sep. 14, 2011, published on Nov. 6, 2010, 21 pages.

"eSoft unveils SiteFilter 3.0 for OEMs," Infosecurity, Mar. 23, 2010, available at http://www.infosecurity-magazine.com/view/8273/esoft-unveils-sitefilter-30-for-oems/, retrieved on Mar. 20, 2012, published on Mar. 23, 2010, 2 pages.

"Get the Physical Location of Wireless Router From its MAC Address (BSSID)," Coderrr, available at http://coderrr.wordpress.com/2008/09/10/get-the-physical-location-of-wireless-router-from-its-mac-address-bssid/, retrieved on Mar. 30, 2012, published on Sep. 12, 2008, 13 pages.

"Hooking—Wikipedia, the Free Encyclopedia," Wikipedia, available at http://web.archive.org/web/20100415154752/http://en.wikipedia.org/wiki/Hooking, retrieved Mar. 30, 2012, published on Apr. 15, 2010, 6 pages.

Mytton, David "How to Build an Apple Push Notification Provider Server (Tutorial)," Server Density, available at http://blog.serverdensity.com/2009/07/10/how-to-build-an-apple-push-notification-provider-server-tutorial/, retrieved on Apr. 2, 2012, published on Jul. 10, 2009, 33 pages.

"Pidgin the Universal Chat Client," Pidign, available at http://www.pidgin.im/, retrieved Sep. 14, 2011, published on May 1, 2007, 14 pages.

Pogue, David "Simplifying the Lives of Web Users," The New York Times, available at http://www.nytimes.com/2010/08/19/technology/personaltech/19pogue.html, retrieved May 17, 2011, Published on Aug. 18, 2010, 5 pages.

"Twilio Cloud Communications Web Service API for Building Voice and SMS Applications," Twilio, available at http://www.twilio.com, retrieved Sep. 14, 2011, published on Jun. 5, 2008, 12 pages.

"Understanding Direct Push," Microsoft, Feb. 18, 2009, available at http://technet.microsoft.com/en-us/library/11997252(v=exchg.80).aspx, retrieved on Mar. 30, 2012, published on Feb. 18, 2009, 3 pages.

"Urban Airship: Powering Modern Mobile," available at http://urbanairship.com/products/, retrieved on Sep. 16, 2011, published on Feb. 19, 2010, 14 pages.

"zVeloDB URL Database," zVelo, available at https://zvelo.com/technology/zvelodb-url-database, retrieved Mar. 30, 2012, published on Jan. 21, 2012, 2 pages.

Amazon.com: Mining the Web Discovering Knowledge from Hypertext Data (9781558607545): Soumen Chakrabarti: Books, Amazon available at http://www.amazon.com/exec/obidos/ASIN/1558607544/, retrieved on Jun. 7, 2012, published on Dec. 13, 2001, pp. 1-7.

Clickatell, available at http://www.clickatell.com, retrieved Sep. 14, 2011, published on Jan. 18, 2011, 11 pages.

Dashwire: Manage Your Cell Phone on the Web, News Blog, with Jessica Dolocourt, Oct. 29, 2007, 5:00am PDT <http://news.cnet.com/8301-10784_3-9805657-7.html> retrieved Jun. 15, 2009; pp. 1-3.

Diligenti, M., et al. Focused Crawling Using Context Graphs:, Proceedings of the 26th VLDB Conference, Cairo, Egypt, pp. 1-8, available at www.vldb.org/conf/2000/P257.pdf, retrieved on Oct. 21, 2008, published on Sep. 10, 2000.

Grafio "Stay Secure", available at http://widgets.opera.com/widget/4405/, retrieved Oct. 21, 2008, published on Sep. 29, 2008.

McAfee, Internet Archive, Way Back Machine, available at <http://web.archive.org/web/20080611095201/www.qualys.com/solutions/vulnerability_management>retrieved Feb. 24, 2011, 1 page.

HTC "Mobile Wipe Smark Phone Management", pp. 1-4, published on Dec. 5, 2007, retrieved on Dec. 5, 2007.

PagerDuty, available at http://www.pagerduty.com, retrieved on Sep. 14, 2011, published on Jun. 6, 2009, 23 pages.

PCT "International Search Report and Written Opinion of the International Searching Authority for PCT/US2009/061370", mailed on Dec. 14, 2009.

PCT "International Search Report and Written Opinion of the International Searching Authority for PCT/US2009/061372", mailed on Mar. 24, 2010; received on Mar. 29, 2010.

PCT, "International Search Report and Written Opinion of the International Searching Authority for PCT/US2011/049182", mailed on Dec. 23, 2011.

Prey, available at http://preyproject.com/, retrieved Jan. 10, 2012, published on May 16, 2009, 4 pages.

Qualys, "Executive Dashboard," Internet Archive, Way back Machine, availble at <http://web.archive.org/web20080507161417/www.qualys.com/products/screens/?screen=Executive + Dashboard>, retrieved Feb. 23, 2011, 1 page.

Qualys, "Vulnerability Management," Internet Archive, Way Back Machine, available at <http://web.archive.org/web/20080611095201/www.qualys.com/solutions/vulnerability_management> Retrieved Feb. 24, 2011, 1 page.

Real world Computing, Jun. 16, 2008 (PC Pro), pp. 1-2.

Simone, "Playing with ActiveMQ," Mostly Useless, available at http://www.mostly-useless.com/blog/2007/12/27/playing-with-activemq/, retrieved Mar. 30, 2012, published on Dec. 27, 2007, 6 pages.

Teh, Joe, "Norton 360 Version 3.0 Review,"Mar. 9, 2009, Available at <http://techielobang-com/blog/2009/03/09/norton-360-version-30-review/> Retrieved Feb. 23, 2011, 12 pages.

(56) References Cited

OTHER PUBLICATIONS

"Sprint—Report that your device is lost or stolen", web page downloaded Apr. 11, 2013 from http://support.sprint.com/support/article/Report_that_your_device_is_lost_or_stolen/case-ba416758-20090629-143222.

Non-Final Office Action dated Apr. 14, 2011 for U.S. Appl. No. 12/255,614, filed Oct. 21, 2008; pp. 1-6.

Non-Final Office Action dated Apr. 13, 2011 for U.S. Appl. No. 12/255,621, filed Oct. 21, 2008; pp. 1-7.

Final Office Action dated Feb. 1, 2011 for U.S. Appl. No. 12/255,626, filed Oct. 21, 2008; pp. 1-18.

Non-Final Office Action dated Mar. 24, 2011 for U.S. Appl. No. 12/255,635, filed Oct. 21, 2008; pp. 1-17.

Notice of Allowance dated Nov. 3, 2011 for U.S. Appl. No. 12/255,632, filed Oct. 21, 2008; pp. 1-5.

Non-Final Office Action dated Apr. 13, 2011 for U.S. Appl. No. 12/255,632, filed Oct. 21, 2008; pp. 1-7.

Non-Final Office Action dated Dec. 26, 2012 for U.S. Appl. No. 13/160,382, filed Jun. 14, 2011; pp. 1-23.

Virus Total, VT Community, www.virustotal.com/index.html; Dated Dec. 16, 2011; 44 Pages.

Windows Update, Internet Archive, Way Back Machine, available at <http://web.archive.org/web/20071022193017/http://en.wikipedia.org/wiki/Windows_Update> Retrieved Feb. 23.

Sprite Mobile, Sprite Backup, Internet Archive, Way Back Machine, available at http://web.archive.org/web/20080901220103/http://www.spritesoftware.com/?page_id=280, 4 pages, R.

PCT International Preliminary Report on Patentability for PCT/US2011/049182; Mailed on Mar. 7, 2013; pp. 1-9.

"Virgin Media—Phone Lost or Stolen?", web page downloaded Apr. 11, 2013 from http://www.virginmobile.com/vm/ukCoverage.do?contentId=insurance.howdoi.sm283.

Trillian, available at http://www.trillian.im/, retrieved on Sep. 14, 2011, published on Oct. 11, 2007, 24 pages.

PCT "International Search Report and Written Opinion of the International Searching Authority for PCT/US2013/027166", mailed on Jun. 19, 2013; received on Jun. 21, 2013.

Tedeschi, Bob, "In Choosing a New Phone, Online Research Goes Only So Far", The New York Times, Oct. 7, 2009; downloaded Jul. 13, 2013 from http://www.nytimes.com/2009/10/08/technology/personaltech/08smat.html?_r=0.

\* cited by examiner

ANALYZING DATA GATHERED THROUGH DIFFERENT PROTOCOLS

CROSS REFERENCE TO RELATED APPLICATIONS

The present application is a continuation of U.S. patent application Ser. No. 13/284,248, filed Oct. 28, 2011, which is a continuation of U.S. patent application Ser. No. 12/255,614, filed Oct. 21, 2008, issued as U.S. Pat. No. 8,051,480 on Nov. 1, 2011, and is related to the following U.S. Patents: U.S. patent application Ser. No. 12/255,635 entitled "SECURITY STATUS AND INFORMATION DISPLAY SYSTEM," filed Oct. 21, 2008, issued as U.S. Pat. No. 8,060,936 on Nov. 15, 2011; U.S. patent application Ser. No. 12/255,632, entitled "SECURE MOBILE PLATFORM SYSTEM," filed Oct. 21, 2008, issued as U.S. Pat. No. 8,087,067 on Dec. 27, 2011; U.S. patent application Ser. No. 12/255,626 entitled "SYSTEM AND METHOD FOR A MOBILE CROSS-PLATFORM SOFTWARE SYSTEM," filed on Oct. 21, 2008, issued as U.S. Pat. No. 8,099,472 on Jan. 17, 2012 and U.S. patent application Ser. No. 12/255,621 entitled "SYSTEM AND METHOD FOR ATTACK AND MALWARE PREVENTION," filed on Oct. 21, 2008, issued as U.S. Pat. No. 8,108,933 on Jan. 31, 2012 all of which are hereby incorporated by reference.

FIELD

The present invention relates generally to network security, and specifically, to securing multiple network interfaces on a mobile communications device

BACKGROUND

Mobile communications devices such as cell phones, smartphones, and PDAs, have advanced well beyond devices that simply carry voice communications. Today's mobile communications devices are frequently used to receive and transmit data as well, including files, email and SMS or text messages. This data may be received through one or more device "entry points," such as over the cellular network, a data network, WiFi, Bluetooth or others. These device entry points are also known as "network interfaces" because they each provide an interface to a different network. As people rely upon their mobile communications devices to transmit and receive data through these network interfaces, it becomes important to ensure that these network interfaces are secure. Each new network interface corresponds to a different communications protocol, allowing hackers and cyber-terrorists additional ways to discover and exploit vulnerabilities in the different protocols and/or network interfaces.

Since many mobile communications devices are designed to mimic the functionality of traditional desktop and laptop computing platforms, the methods used to protect these traditional platforms are often appropriated for the mobile communications device. However, traditional desktop, laptop and even server computers do not share the same network interface issues found in modern mobile communications devices. This is because traditional platforms typically use a single network interface, such as an Ethernet interface. This network interface typically uses a limited number of communications protocols, such as TCP/IP or other IP-based protocols. As such, protecting that network interface is simply a matter of monitoring the data received by that interface. In other words, unlike a mobile communications device that may have multiple network interfaces, a computer may only be secured at a single network interface.

For those computers that have multiple network interfaces, such as Bluetooth or infrared in addition to Ethernet, present security methods still monitor transmitted and received data, but the data is funneled to single software component tied to the computer's operating system. This component will typically apply what is well-known as the "least common denominator" method to determine if the received data presents any risks or inconsistencies. In essence, however, these prior security methods treat all incoming data as if they are received at the Ethernet interface. More specifically, these prior art security methods treat all data as if they are transmitted using an IP-based communications protocol. Some mobile communications devices mimic this type of security system by monitoring TCP/IP traffic received by the mobile communications device. However, this type of security system ignores the mobile communications device's ability to receive non-TCP/IP traffic. This is illustrated in FIG. 1.

FIG. 1 shows various hardware-implemented network, communications or software-defined interfaces such as infrared transceiver 101, Bluetooth radio 102, WiFi radio 103, USB interface 104, cellular radio receiver 105 including cellular data connection 106 and SMS 107, and near field communication 108. In addition, various software-implemented interfaces, services and communications protocols are shown, including infrared services 111, Bluetooth services including SDP 112, OBEX 113, HFP/HSP 114 and BNEP 115, other network services and applications 116, WAP 122 and WAP services 117, SIM toolkit 118, text messaging 119 and other SMS services 120. Data received utilizing these network interfaces, services and protocols generally travels directly to the operating system subsystem that handles, manages or executes this data. For example, data received by the infrared receiver 101 or data in the form of an infrared communications protocol 131 is managed by the operating system's infrared subsystem 131. Data received by the WiFi radio 103, USB interface 104, Cellular data connection 106, or BNEP 115 is managed by the operating system's networking subsystem 133, where it may be further directed through TCP/IP subsystem 121 to network services and applications 116. FIG. 1 illustrates that various communications pathways a mobile communications device may utilize a variety of network interfaces and communications protocols. However, in prior art mobile communications device security systems, only TCP/IP or other traditional network traffic is monitored and analyzed. In other words, prior art security systems only protect received data traveling through Operating system's networking subsystem TCP/IP subsystem 121 and/or the mobile communications device operating system network subsystem 133. FIG. 1 illustrates that not all data will be transmitted to a mobile communications device using these communications pathways and, as a result, there are a number of vulnerabilities that are ignored by prior art security methods.

FIG. 1 also illustrates that certain communications protocols may be layered. For example, the Bluetooth radio 103 may receive data encoded using the Bluetooth communications protocol stack. As such, the data may be further layered using SDP 112, OBEX 113, HFP/HSP 114, BNEP 115, etc. Not only are prior art systems unable to monitor data received over the non-TCP/IP portions of the Bluetooth network interface, but prior art security systems lack the ability to identify, examine and track lower-level protocol layers for any security threats.

What is therefore needed is a way to monitor all of the different network interfaces and that also tracks all of the protocols used by these network interfaces on a mobile communications device.

Prior art security systems also tend to focus on data as it is received or is stored on the mobile communications device. This does not provide a complete picture of all of the data communications to and from a mobile communications device, and in particular, does not prevent attacks that do not come over TCP/IP and do not utilize the file system before compromising the device. For example, if a mobile communications device receives self-propagating malware such as a worm which uses an exploit to propagate, prior art security systems may not detect the exploit being used to install the malware. After the exploit compromises the system, it can disable any security functionality and be able to install the worm to the file system without hindrance. Further, prior art security systems will not likely prevent the worm from spreading because outbound data transmissions, especially over non TCP/IP networks, are not often monitored. As such, present mobile communications devices are vulnerable to a multitude of attacks, which could not only disrupt daily life, government, and commerce, but also provides a significant vehicle for large-scale cyber-terrorist or criminal attacks.

What is therefore needed is a way to monitor outbound data transmission from a mobile communications device and prevent attacks that compromise the system before passing through the operating system's networking subsystem.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The present invention is a system and method for monitoring and analyzing data transmitted and received by a mobile communications device over multiple network interfaces, regardless of the data's communications protocol. As used herein, a "mobile communications device" may refer to a cell phone, handset, smartphone, PDA, and the like. A mobile communications device may primarily be used for voice communications, but may also be equipped to receive and transmit data, including email, text messages, video, and other data. This data may be received as packets or streams transmitted using one or more communications protocols, including cellular, TCP/IP, Bluetooth, infrared, radio frequency networks, USB, etc. This data is often packaged, encapsulated or layered such that more than one protocol may be used. The present invention provides a way to monitor and analyze data encapsulated in multiple protocol layers and received through one of many network interfaces, thereby minimizing the mobile communications device's exposure and protecting the device from harm. In addition, the present invention provides a way to monitor and track data that is transmitted from the device, to ensure that the device is not used to propagate malicious software.

It should be appreciated that the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

A. System Architecture

Figure 2:
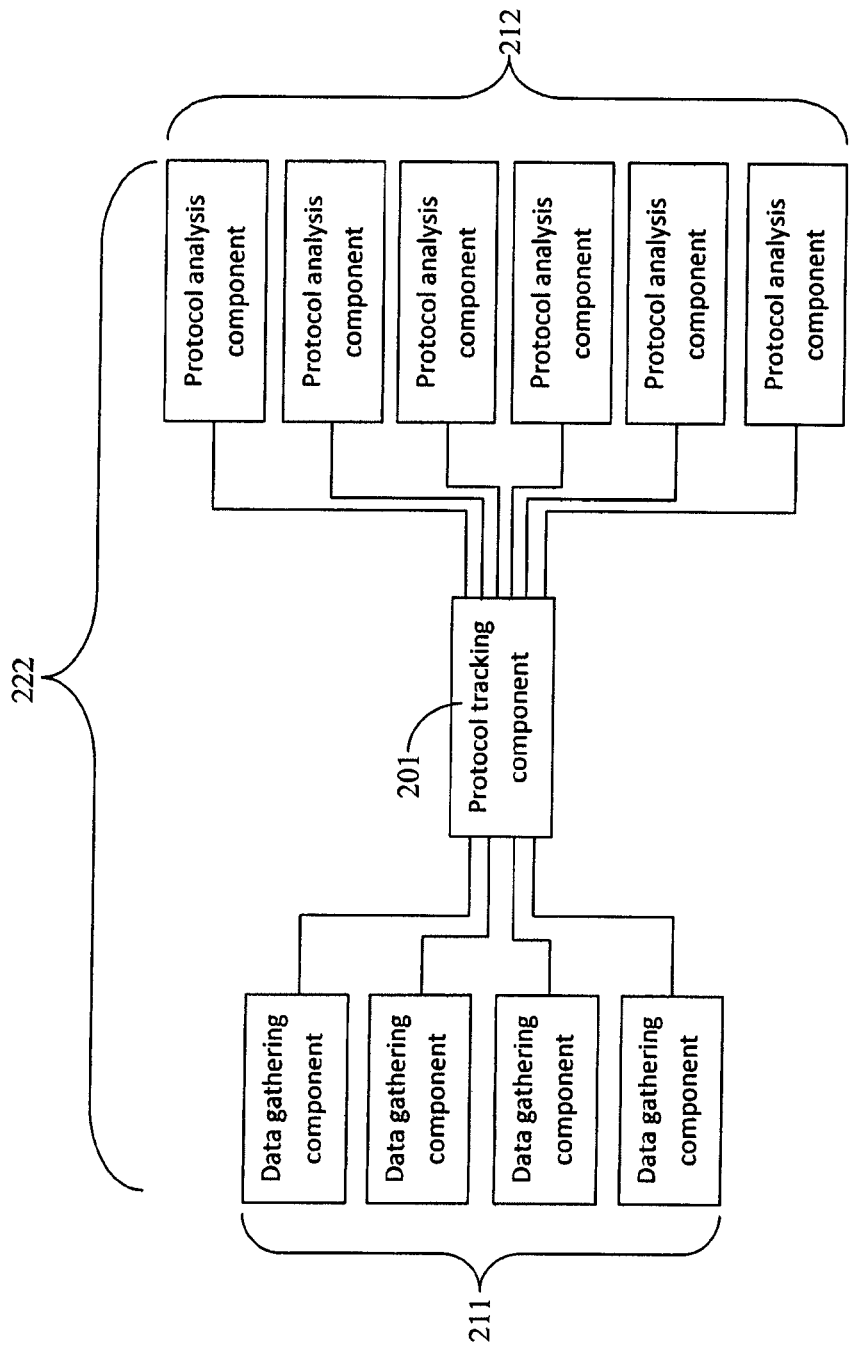
FIG. 2 is an exemplary block diagram illustrating a system embodiment of the present invention.

FIG. 2 illustrates some of the various software components that may comprise a system embodiment of the present invention. These software components may be installed on a mobile communications device such that data analysis is performed entirely on the device. However, one skilled in the art will appreciate that portions of the received data may be analyzed by or on a remote server, in which case data transmitted to the device may be sent to the server for analysis.

Figure 1:
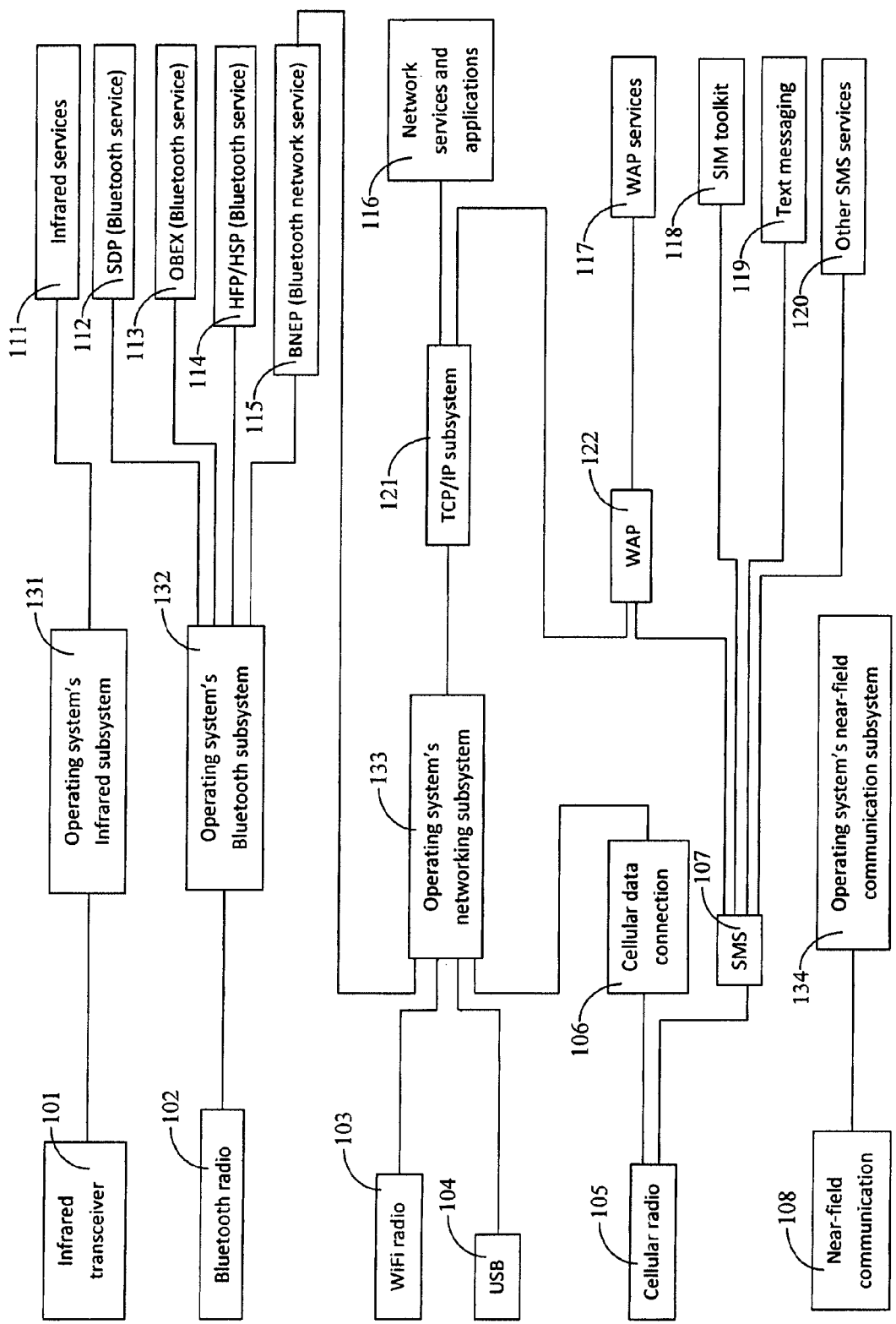
FIG. 1 is an exemplary block diagram depicting a prior art communications pathway.

In general, the system embodiment of the present invention may be comprised of three software components: data gathering component 211, protocol tracking component 201 and protocol analysis component 212, as shown in FIG. 2. Data may be received by, transmitted from, or otherwise intercepted on the mobile communications device at one or more network interfaces on the device (see FIG. 1). The data is gathered by one or more data gathering components 211 and passed to protocol tracking component 201 after some initial analysis. Protocol tracking component 201 may perform further analysis on the data by calling one or more protocol analysis components 212. This analysis is discussed further below, but may include identifying and determining if there are any other protocol layers in the received data. Reference character 222 refers to a system embodiment comprising at least one data gathering component 211, at least one protocol tracking component 201, and at least one protocol analysis component 212, as well as the means to send data and information between each component.

FIG. 2 illustrates that in an embodiment, there may be multiple instances of the data gathering component 211 and the protocol analysis component 212, and a single instance of the protocol tracking component 201. For example, there may be a data gathering component for each network interface on the mobile communications device. One data gathering component may correspond to the device's Bluetooth interface, another data gathering component for the device's infrared interface, another for the WiFi interface, and so on. Similarly, there may be a protocol analysis component for each communications protocol. For example, the Bluetooth interface receives data transmitted using various Bluetooth protocols. As such, there may be a protocol analysis component for protocols such as HCI, L2CAP, RFCOMM, OBEX, SDP, BNEP, and others. The data may contain additional layers or stacks, as is common with most network communications protocols. Therefore, there may be protocol analysis components for each underlying protocol layer or stack. As each underlying protocol is identified, the protocol tracking component 201 will call a respective protocol analysis component to parse and analyze a layer. If a protocol analysis component identifies another layer during its analysis, it will send this information to the protocol tracking component 201 that will call a respective protocol analysis component for the newly identified layer. This method is further discussed below. One will also appreciate that in an embodiment, there may be a single protocol analysis component capable of handling all communications protocols.

Figure 3:
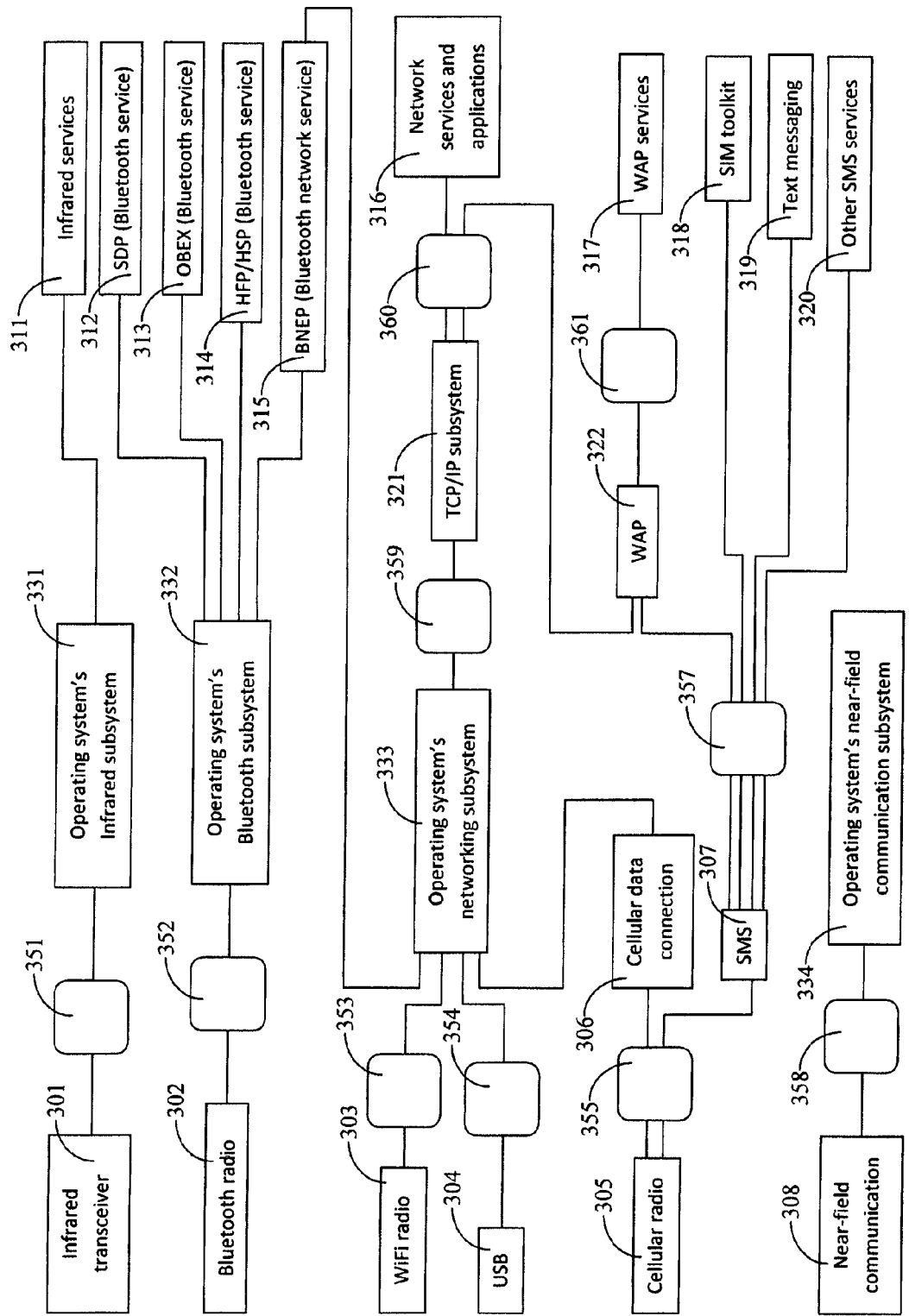
FIG. 3 is an exemplary block diagram depicting a communications pathway for an embodiment of the present invention.

In an embodiment, the calling of the data gathering components 211 and the protocol analysis components 212 is designed to be dynamic such that data can travel throughout the mobile communications device using multiple pathways, and may be subsequently analyzed by selecting the appropriate protocol analysis component 212 as identified by protocol tracking component 201. This is illustrated in FIG. 3. As shown, data is received and transmitted through network interfaces such as infrared receiver 301, Bluetooth radio 302, WiFi radio 303, USB interface 304, cellular radio 305, near-field communication interface 308, etc. However, instead of allowing data to proceed directly to the respective operating system subsystem, the data is gathered, tracked and analyzed by system 222. Since each instance of system 222 may differ depending upon the network interface and communications protocol, each instance is labeled uniquely in FIG. 3 as 351, 352, 353, 354, 355, 357, 358, 359, 360 and 361. One will appreciate, however, that each instance of system 222 does not have to be unique from another instance. Any one of systems 351, 352, 353, 354, 355, 357, 358, 359, 360 and 361 may be the same or may differ from the other.

For example, in an embodiment, data received by or transmitted from infrared transceiver 301 may be gathered, tracked and analyzed by system instance 351, which may comprise one or more data gathering components, a single protocol tracking component, and one or more protocol analysis components as shown in FIG. 2. Similarly, data received by or transmitted from Bluetooth radio interface 302 may be gathered, tracked and analyzed by system instance 352, which may also comprise one or more data gathering components, the protocol tracking component, and one or more protocol analysis components. The gathering, tracking and analyzing steps are discussed further below. In an embodiment, the data gathering components and protocol analysis components may be the same or may differ between each network interface, depending upon the protocol used. For example, in order to optimize mobile communications device resources, a protocol analysis component may be able to identify and analyze multiple protocols if the protocols are similar enough. A protocol analysis component is also able to analyze a given protocol transmitted or received through different interface types and in different protocol stacks.

FIG. 3 also illustrates that an instance of system 222 may be placed between subsystems. System instance 359 may gather, track and analyze data from TCP/IP subsystem 321 and operating system networking subsystem 333. One will appreciate that system instance 359 may perform its gathering, tracking and analyzing after system instance 360 has performed its functions. System instance 359 may thereby analyze a different layer of the TCP/IP protocol stack than system instance 360, and similarly system instance 360 may analyze a different layer of a protocol stack than system instance 361 and/or system instance 357.

In an embodiment, the present invention allows the operating system's normal reassembly, decryption, and other data processing functions to operate on data so that assumptions are not made by the analysis or security components as to how the operating system will process data. For example, when a packet corresponding to a TCP stream is received over Ethernet, protocol layers up to TCP may be analyzed before the TCP/IP reassembles the packet into part of a stream. If system instance 359 were to try to reassemble the stream and make security decisions separately from how the operating system reassembles the stream, an attacker may take advantage of this configuration so as to make a stream reassemble differently in system instance 359 than in operating system TCP/IP subsystem 321. By allowing multiple system instances to operate on data at different portions of the protocol stack, the present invention can protect the device in a layered fashion by analyzing data before it is processed, but waiting until lower layer processing has been completed by the operating system before processing higher layer protocols. By utilizing the protocol tracking component 201, data as a part of a stream can be deterministically linked to the packets which contain segments of that stream. In another example, the present invention can inspect encrypted data by performing analysis of the decrypted data after the operating system has performed the decryption and is passing the data to the next component in the pathway. In an embodiment, protocol analysis components 212 may be configured to signal for or otherwise instruct the protocol tracking component 201 to stop analyzing data in anticipation of further analysis by another system instance at another point in the data pathway. Alternatively, the protocol tracking component 201 may determine when to stop analyzing data. In a further embodiment, the data gathering component 211 may configure the protocol tracking component 201 or protocol analysis components 212 to stop processing data when certain protocol criteria are met in anticipation of a further system instance at another point in the data pathway.

Therefore, as shown in FIG. 3, the system embodiment of the present invention is able to receive data from multiple sources using any number of network interfaces, and the system is able to dynamically analyze each layer of the data, thereby ensuring that all received data is fully identified and analyzed. The system embodiment may perform its functions at any point in the communications pathway. This is an improvement over prior art which only performs perfunctory analysis at a single network interface on a single communications protocol, and only on data that is received, not transmitted. As such, the present invention provides added protection over prior art systems. The various methods employed by the present invention are discussed in the following section.

By way of example, malware, viruses and other security threats can inhabit different data layers depending upon their intended target. The system embodiment of the present invention ensures that no layer is ignored. Once each layer is identified and analyzed, the data may be passed to a security system for further analysis, such as identifying if any threats are present in the data layers, and taking remedial action. Alternatively or in conjunction, the analysis component for each protocol may incorporate a security system to analyze each layer individually. Examples of how malware may be identified and quarantined are discussed in co-pending U.S. Patent Application [1129.05], entitled "SYSTEM AND METHOD FOR ATTACK AND MALWARE PREVENTION," incorporated in full herein.

One skilled in the art will appreciate that there are many ways to create and install the present invention on a mobile communications platform. In an embodiment, the present invention is designed and built on a cross-platform system such as the one discussed in co-pending U.S. Patent Application [1129.04], entitled "SYSTEM AND METHOD FOR A MOBILE CROSS-PLATFORM SOFTWARE SYSTEM," incorporated in full herein. In this embodiment, data gathering components 211 may be platform-specific, in that they may be designed to utilize the specific functionalities of the mobile communications device on which it is installed. Since different mobile communications devices offer different network interfaces, the present invention may be customized to monitor only those network interfaces that are available. Additionally, one device's Bluetooth receiver may differ from another's, even though they may both accept the same Bluetooth protocols. As such, by identifying and accounting for these differences during the platform-specific phase of development, one skilled in the art can ensure full compatibility.

On a cross-platform system, the protocol tracking component 201 may be considered platform-independent or a core software component. Communications protocols are developed to encapsulate, encode, and transport data, regardless of platform. As such, data received in a particular protocol should not differ based upon what platform is receiving the data. Since communications protocols are inherently platform-independent, one skilled in the art can program the software code for the protocol tracking component 201 in the core platform-independent component of the cross-platform system.

On a cross-platform system, the protocol analysis components may be considered platform-independent or platform-specific, depending upon the communications protocol that is being analyzed. For example, some protocols are well-defined regardless of platform, such as Bluetooth. As such, the respective protocol analysis components for the Bluetooth protocol layers may be platform-independent. Conversely, some protocols differ between mobile communications devices, such as text messaging or SMS. Therefore, the respective protocol analysis components for text messaging and SMS may be platform-specific. One will appreciate that the configuration of the present invention on a cross-platform system is merely exemplary, is not intended to limit the disclosure of the present invention or the inventions disclosed in any co-pending patent applications that are incorporated by reference.

One skilled in the art will also appreciate that the present invention need not be cross-platform, but can be built specifically for the mobile communications device upon which it resides. Variations of the software structure and system architecture of the present invention are possible without departing from this disclosure or the scope of the present invention.

B. Protocol Tracking and Analysis Method

Figure 4:
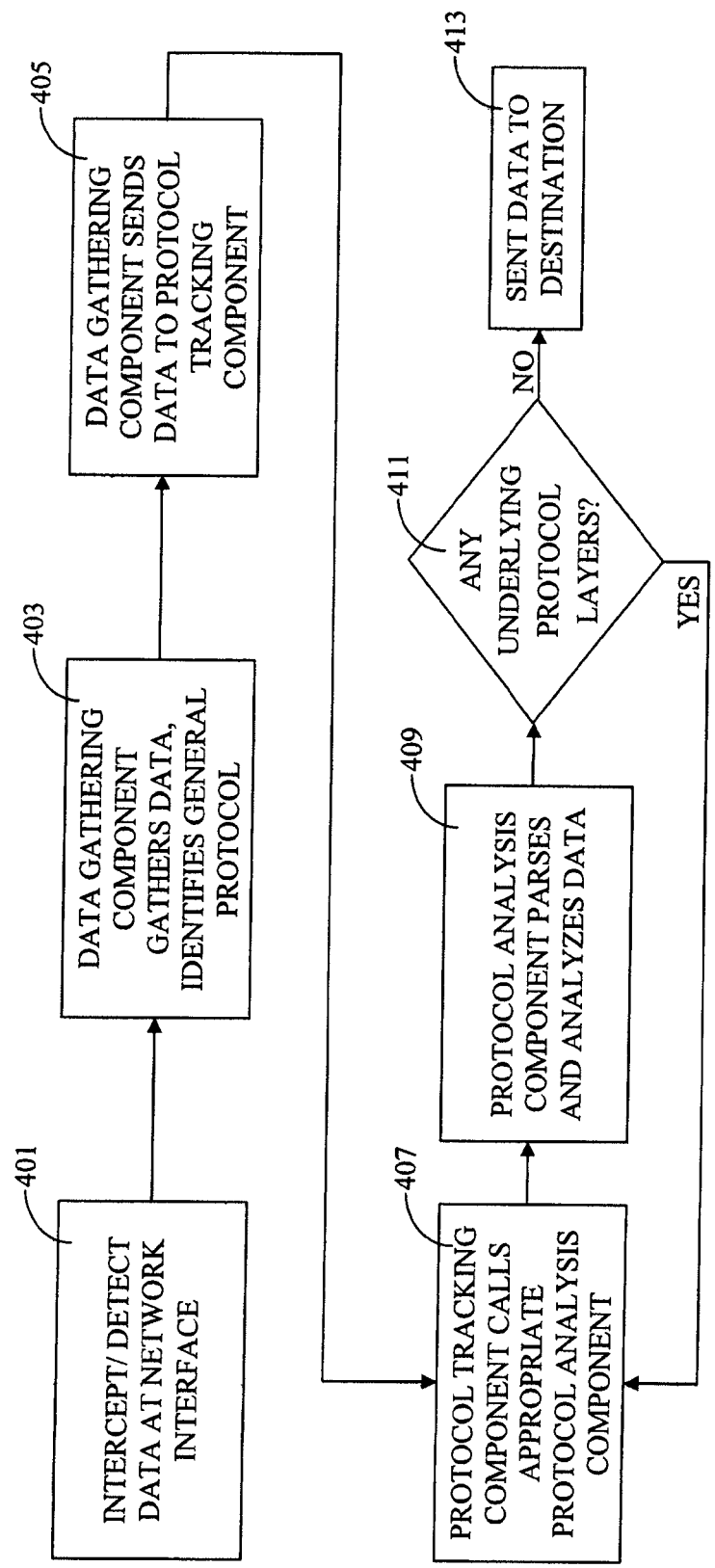
FIG. 4 is an exemplary flow diagram illustrating a method embodiment of the present invention.

As discussed above, data may be received by the mobile communications devices using one or more network interfaces, and then analyzed to identify the one or more protocols. FIG. 4 illustrates an exemplary method of how received or transmitted data may be treated by the system described above. One will appreciate that the method shown in FIG. 4 may performed in whole or in part by the various system components illustrated in FIG. 2. One will also appreciate that the steps shown in FIG. 4 need not be performed sequentially, but may be performed in a different order by different instances of the system illustrated in FIG. 2. One will further appreciate that variations of the method illustrated in FIG. 4 may be performed simultaneously by different instances of the system illustrated in FIG. 2.

In step 401, data is intercepted or detected at a network interface, either as it is received or before it is transmitted. This data is gathered and preliminarily analyzed by a data gathering component to determine the general protocol of the data (step 403). Once the general protocol is identified, it is sent to the protocol tracking component (step 405), which calls the appropriate protocol analysis component for that general protocol (step 407). The protocol analysis component may further analyze, may parse the data for source and type, may perform security analyses (step 409), and may then determine whether there is an additional protocol layer in the data or in a subset of the data (step 411). If the protocol analysis component determines that the data corresponding to that given protocol is unsafe, the whole stack of network data being analyzed may not be analyzed further and instead may be passed to the appropriate destination (step 413). If there is no security analysis performed by the protocol analysis component or the data is safe and the protocol analysis component determines that there is data corresponding to another protocol present, then the protocol tracking component will call another protocol analysis component for that additional layer. Once all of the layers have been identified and analyzed, the data passes to the appropriate destination (step 413). This may include sending the data for further security analysis as discussed above, where it may be quarantined, rejected or deleted if found to contain malware. Alternatively, the data may be sent to the appropriate subsystem for handling, execution or storage on the mobile communications device (see FIG. 3). Alternatively, data may be held for further analysis by a respective protocol tracking component. One will appreciate that these steps need not be performed immediately after one another. For example, the protocol layers of a multi-layered protocol stack may be analyzed by the respective protocol analysis component 212 at any time during the data's passage through the communications pathway, so long as each layer is analyzed before it reaches its final destination, regardless if the final destination is the device's operating system subsystem or transmission out of the device.

FIG. 4 illustrates a general method of analysis using the components illustrated in FIG. 2. As will be discussed, the steps shown in FIG. 4 may vary depending upon the type of data received or transmitted by the mobile communications device. The steps may also vary depending on the format of data received or transmitted by the mobile communications device. Each scenario is discussed further below using various examples.

1. Protocol Tracking and Analysis of Bluetooth Data

In a first example, data may be received through a mobile communications device's Bluetooth receiver (step 401). A data gathering component for the Bluetooth network interface will gather the data and will recognize that it uses the Bluetooth protocol (step 403). The data will be sent to the protocol tracking component (step 405), which will call a general Bluetooth protocol analysis component (step 407). The general Bluetooth protocol analysis component will then analyze the data (step 409) and will see if there are any other protocol layers in the received data (step 411). A person having ordinary skill in the art will recognize that Bluetooth may include additional protocol layers, including the Bluetooth Host Controller Interface (HCI), the Logical Link Control and Adaptation Protocol (L2CAP), the Bluetooth Network Encapsulation Protocol (BNEP), the Radio Frequency Communication protocol (RFCOMM), the Object Exchange protocol (OBEX), Ethernet, IP, TCP, HTTP and the like. As such, data transmitted using the Bluetooth protocol can include one or more of these layers depending upon the type and purpose of the data.

In an embodiment, there may be a specific protocol analysis component for each of the protocol layers identified, or in an embodiment, there may be protocol analysis components for groups of similar protocol layers. In the Bluetooth example, there may be a protocol analysis component for HCI, a separate protocol analysis component for L2CAP, another protocol analysis component for BNEP, etc. Alternatively, there may be a protocol analysis component for Bluetooth protocols such as HCI, L2CAP and BNEP, there may be a protocol analysis component for IP-centric network protocols covering the TCP/IP and Ethernet protocol suites, and there may be a protocol analysis component at the network interface stream/socket level supporting protocols such as HTTP, POP3, IMAP, and others. The present invention may also call a combination of these two configurations, such that there is an initial Bluetooth network interface packet level protocol analysis component, then additional protocol analysis components for HCI, L2CAP and BNEP, respectively. These variations of the protocol analysis component ensures that each protocol layer in a data stack is identified and analyzed, regardless if the layer is at a high-level or low-level in the stack. This is an improvement over prior art methods that typically only analyze data at the IP-based packet level. In the present invention, each layer is identified until every layer has been analyzed and passed to the appropriate destination in the mobile communications device (step 413). Additionally, the identification and analysis of each layer does not have to be sequential, but may occur in different stages.

2. Mobile Communications Device Optimization

One skilled in the art will appreciate that the size of the data received and transmitted on the mobile communications device can affect the device's performance. The present invention may be configured to optimize the resources of the mobile communications device. For example, data transmitted and received as stream data is typically comprised of data chunks. In other words, large data files may be subdivided into chunks, and each chunk will be identifiable by associated metadata, such as a chunk header. In the present invention, the data gathering components may therefore gather these data chunks, send them to the protocol tracking component, which then sends them to the appropriate protocol analysis component. The protocol analysis components may therefore analyze each received chunk, which may only be portions of the entire data stream. In order to ensure that the entire data stream is fully analyzed, chunks may be temporarily stored by the respective protocol analysis component until it receives the rest of the data stream's chunks from the data gathering component, by way of the data tracking component. In other words, protocol analysis components may pause analysis before proceeding further to ensure that data is fully analyzed. Alternatively, the protocol tracking component may temporarily store data stream chunks before sending them to the appropriate data analysis component.

Temporary storage may be accomplished by using one or more temporary buffers, or may be minimized by utilizing a virtual machine. For example, data transmitted using the HTTP protocol is typically complex, and may not all be received sequentially or as a complete data object. As such, data gathering components can gather HTTP data as they are received, send them to the protocol tracking component, which may then send them to the appropriate protocol analysis component. In this example, the protocol analysis components may be managed by a virtual software machine. If the data received by a protocol analysis component is incomplete, then the virtual software machine can cause that protocol analysis component to suspend its state, and therefore its analysis and processing, until more data is received. Since these protocol analysis components may be protocol-specific, which may in turn be network interface or port-specific, different protocol analysis components can be tailored to suspend analysis or proceed or perform depending upon the protocol or network interface or port being monitored. Temporary memory buffers for storing portions of data may be practical for mobile communications devices with sufficient memory capacity. Virtual machine configurations, which take up less memory and resources than buffers, may be practical for less memory capacity. One will appreciate that there are many variations possible in order to optimize performance on the mobile communications device. Analysis and processing may also be a combination of buffers and virtual machines (which include stack machines, state machines, and other machine systems that can be implemented in software), and all of the components may be performing simultaneously or intermittently depending upon the amount and type of data being processed, and the capabilities of the mobile communications device.

3. Analysis of Novel Communications Protocols

As new mobile communications devices reach the market, they may incorporate new network interfaces and new protocols. One will appreciate that the present invention is not limited to the network interfaces and communications protocols listed in the above examples. Indeed, the present invention has mechanisms in place to analyze protocols that do not fall within the categories listed above. One will appreciate that communications protocols build upon previous protocols well-known in the industry. If the data gathering component fails to identify an initial protocol for received data, or if the protocol tracking component cannot immediately identify the exact protocol used by the received data, the protocol tracking component may apply deterministic analyses of the data to identify the threat level of the data. For example, data may typically include metadata or header information identifying its source, type and destination. This information may be used to heuristically determine which protocol tracking component is appropriate for analyzing the data. The system may also have mechanisms in place, such as a database or other stored information that identifies common protocol layers in a particular stack. As such, even if the layers are not immediately identifiable, the system may refer to this database to determine common protocol layers associated with the data, and may analyze the data accordingly using the appropriate protocol tracking component. This flexibility enables the present invention to adapt to new and unknown protocols, thereby extending the applicability of the present invention to numerous mobile communications device platforms.

4. Countering Cyber-Terrorism

One of the benefits of the present invention is its ability to dynamically analyze data by communications protocols at any stage of the communications pathway on mobile communications device. As such, the present invention provides increased monitoring and protection of a mobile communications device where previously none existed. As noted above, prior art methods ignore non-TCP/IP data, which exposes a significant amount of network vulnerabilities. Because the present invention significantly reduces these network vulnerabilities, the present invention provides a significant line of defense against cyber-terrorist attacks. Using the present invention, cyber-terrorists will be much less able to exploit network interface or protocol vulnerabilities on mobile communications devices. Additionally, since the present invention protects both received and transmitted data, cyber-terrorists will be less able to hijack or otherwise misappropriate mobile communications devices to propagate malicious software.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto.

What is claimed is:

1. A method of performing a security analysis of a set of data received on a mobile communications device, the method comprising:
   on a mobile communications device having multiple network hardware interfaces for receiving data, in response to receipt of the set of data by the mobile communications device through a first type of network hardware interface and a second type of network hardware interface, gathering information about the set of data received by the mobile communications device, a first subset of the set of data received at the first type of network hardware interface and a second subset of the set of data received at the second type of network hardware interface having different protocols;
   based upon the gathering step, assigning a first protocol to the first subset of data received from the first type of network hardware interface and assigning a second protocol to the second subset of data received from the second type of network hardware interface; and
   performing a common security analysis on at least a part of the data received from each of the first and second types of network hardware interfaces to determine whether the set of data received by the mobile communications device is safe or malicious, the common security analysis including:
      analyzing the first subset of data formatted according to the first protocol using a first protocol analysis component, and
      analyzing the second subset of data formatted according to the second protocol using a second protocol analysis component.

2. The method of claim 1, wherein the step of performing a common security analysis further comprises:
   determining whether there is an additional protocol layer in the received data or in a subset of the received data; and
   if so, performing an additional security analysis on at least a part of the received data in the determined additional protocol.

3. The method of claim 1, wherein if the step of gathering information fails to result in assigning a protocol to data received from at least one of the first and second types of network hardware interfaces, the step of performing a common security analysis applies at least one deterministic analysis to at least a part of the received data.

4. A method of performing a security analysis of a set of data to be transmitted using two different types of network hardware interfaces of a mobile communications device, the method comprising:
   in response to a request to transmit the set of data to be transmitted from the mobile communications device, gathering information about the set of data to be transmitted by the mobile communications device, the set of data to include a first subset of data for a first type of network hardware interface and a second subset of data for a second type of network hardware interface;
   identifying a first protocol of the first subset of data to be transmitted and a second protocol of the second subset of data to be transmitted; and
   performing a common security analysis on at least a part of the data to be transmitted using each of the two types of network hardware interfaces to determine whether the set of data to be transmitted by the mobile communications device is safe or malicious, the common security analysis including:
      analyzing the first subset of data formatted according to the first protocol using a first protocol analysis component, and
      analyzing the second subset of data formatted according to the second protocol using a second protocol analysis component.

5. The method of claim 4, wherein the step of performing a common security analysis further comprises:
   determining whether there is an additional protocol layer in the data to be transmitted or in a subset of the data to be transmitted; and
   if so, performing an additional security analysis on at least a part of the data to be transmitted in the determined additional protocol.

6. The method of claim 4, wherein if the step of identifying fails to identify a protocol of the data to be transmitted by at least one of the two types of network hardware interfaces, the step of performing a common security analysis applies at least one deterministic analysis to at least part of the data to be transmitted.

7. A method of determining whether to allow or deny use of a set of data received using two different types of network hardware interfaces of a mobile communications device, the method comprising:
   in response to a request for the mobile communications device to use the received data, identifying a first protocol of a first subset of the data received from a first of the two types of network hardware interfaces and identifying a second protocol of a second subset of the data received from a second of the two types of network hardware interfaces;
   performing a common security analysis on at least a part of the data received using each of the two network hardware interfaces according to their respective identified protocols, the common security analysis including:
      analyzing the first subset of data formatted according to the first protocol using a first protocol analysis component, and
      analyzing the second subset of data formatted according to the second protocol using a second protocol analysis component; and
   permitting further use of the received set of data based a determination of whether the data received by the mobile communications device is safe or malicious.

8. The method of claim 7, wherein the step of performing a common security analysis further comprises:
   determining whether there is an additional protocol layer in the received data or in a subset of the received data; and
   if so, performing an additional security analysis on at least a part of the received data in the additional protocol.

9. The method of claim 7, wherein if the steps of identifying fail to identify a protocol of the received data, the step of performing a common security analysis applies at least one deterministic analysis to at least part of the received data.

10. A method of determining whether to allow or deny transmission of a set of data using two different types of network hardware interfaces of a mobile communications device, the method comprising:
   in response to a request to transmit the set of data from the mobile communications device, identifying a first and a second protocol of the data to be transmitted, the first and second protocols corresponding to a first type and a second type of network hardware interface;
   performing a common security analysis on at least a part of the data to be transmitted using each of the two types of network interfaces according to their respective identified protocols, the common security analysis including:

analyzing a first subset of data formatted according to the first protocol using a first protocol analysis component, and analyzing a second subset of data formatted according to the second protocol using a second protocol analysis component; and allowing or denying transmission of the set of data to be transmitted based upon a determination of whether the data to be transmitted by the mobile communications device is safe or malicious.

11. The method of claim 10, wherein the step of performing a common security analysis further comprises:

determining whether there is an additional protocol layer in the data to be transmitted or in a subset of the data to be transmitted; and if so, performing an additional security analysis on at least a part of the data to be transmitted in the determined additional protocol.

12. The method of claim 10, wherein if the step of identifying fails to identify a protocol of the data to be transmitted, the step of performing a common security analysis applies at least one deterministic analysis to at least a part of the data to be transmitted.

13. A method comprising:

on a mobile communications device that employs two different types of network hardware interfaces each type employing a different communications protocol, wherein a communications protocol is for receiving and processing data by mobile communications device operating system sub-systems, at a mobile communications device security system, receiving a set of data from the two network interface sources and in the two communications protocols;

in response to the interception or detection of the set of data received using the two network hardware interface sources, at the mobile communications device security system, before the set of received data is allowed to reach a downstream destination, identifying at least the two communications protocols;

at the mobile communications device security system, based at least in part upon the identified communications protocols, performing a common security analysis on at least part of the received data of each of the two network hardware interfaces to determine if the set of received data should be allowed to reach the downstream destination based upon whether the set of data received by the mobile communications device is safe or malicious, the common security analysis including:

analyzing a first subset of the received data formatted according to a first identified communications protocol using a first protocol analysis component, and analyzing a second subset of the received data formatted according to a second identified communications protocol using a second protocol analysis component.

14. The method of claim 13, wherein the step of performing a common security analysis on at least a part of the received data further comprises:

determining whether there is an additional protocol layer in the received data or in a subset of the received data; and if so, performing an additional security analysis on at least a part of the received data in the determined additional protocol.

15. The method of claim 13, wherein if the step of identifying at least the two protocols of the received data fails to identify a protocol of the received data, the step of performing a common security analysis applies at least one deterministic analysis to at least a part of the received data.

16. A method comprising:

on a mobile communications device that employs at least two different communications protocols for processing data by mobile communications device operating system sub-systems, and that employs at least two different types of network hardware interfaces for sending data, at a mobile communications device security system, receiving a set of data from the mobile communications device operating system sub-systems for transmitting using a first type and a second type of network hardware interface node and in first and second different communications protocols corresponding to the first and second types of network hardware interface nodes on the mobile communications device to a downstream destination;

in response to a request to transmit the set of data through the first and second network hardware interface nodes, at the mobile communications device security system, before the data to be transmitted by the mobile communications device security system is transmitted to the downstream destination, identifying at least the first and second communications protocols;

at the mobile communications device security system, performing a common security analysis on the set of data to be transmitted, based upon each of its identified communications protocols, to determine if the set of data to be transmitted should be allowed to reach the downstream destination based upon whether the set of data received by the mobile communications device is safe or malicious, the common security analysis including:

analyzing a first subset of the set of data formatted according to the first identified communications protocol using a first protocol analysis component, and analyzing a second subset of the set of data formatted according to the second identified communications protocol using a second protocol analysis component.

17. The method of claim 16, wherein the step of performing a common security analysis on at least a part of the data to be transmitted further comprises:

determining whether there is an additional protocol layer in the data to be transmitted or in a subset of the data to be transmitted; and if so, performing an additional security analysis on at least a part of the received data in the determined additional protocol.

18. The method of claim 16, wherein if the step of identifying at least the first and second protocol of the received data fails to identify a protocol of the received data, the step of performing a common security analysis applies at least one deterministic analysis to at least a part of the data to be transmitted.

19. A method comprising:

on a mobile communications device that employs multiple communications protocols for processing data by mobile communications device operating system sub-systems, and that employs multiple network interfaces for receiving and sending data, at a mobile communications device security system, receiving a first subset of a set of data from a first mobile communications device operating system sub-system, and in response to receiving the first subset of data from the first mobile communications device operating system sub-system, identifying a first communications protocol for the first subset of data corresponding to the first mobile communications device operating system sub-system;

in response to a request to transmit the set of data to a second mobile communications device operating system sub-system, the second sub-system being a type of sub-system different from the first, before the set of data to be transmitted is transmitted to the second mobile communications device operating system sub-system, at the mobile communications device security system, identifying a second communications protocol for a second subset of the set of data corresponding to the second mobile communications device operating system sub-system;

based upon the identified first protocol for the first subset of data and the identified second protocol for the second subset of data, respectively, performing a common security analysis of at least a part of the received data and of at least a part of the data to be transmitted to determine whether the set of data to be transmitted should be allowed to reach the second mobile communications device operating system sub-system based upon whether the set of data to be transmitted by the mobile communications device is safe or malicious, the common security analysis including:

analyzing the first subset of data formatted according to the first communications protocol using a first protocol analysis component, and analyzing the second subset of data formatted according to the second communications protocol using a second protocol analysis component.

20. The method of claim 19, wherein the step of performing a common security analysis on at least a part of the received data further comprises:

determining whether there is an additional protocol in the received data or in a subset of the received data; and if so, performing an additional security analysis on at least a part of the received data in the determined additional protocol.

21. The method of claim 19, wherein if the step of identifying a first communications protocol of the received data fails to identify a protocol of the received data, the step of performing a common security analysis applies at least one deterministic analysis to at least a part of the received data.

22. The method of claim 19, wherein the step of performing a common security analysis on at least a part of the data to be transmitted further comprises:

determining whether there is an additional protocol in the data to be transmitted or in a subset of the data to be transmitted; and if so, performing an additional security analysis on at least a part of the data to be transmitted in the determined additional protocol.

23. The method of claim 19, wherein if the step of identifying a second communications protocol of the data to be transmitted fails to identify a protocol of the data to be transmitted, the step of performing the common security analysis applies at least one deterministic analysis to at least a part of the data to be transmitted.

24. On a mobile communications device with an operating system and operating system subsystems, a method comprising:

in response to the interception or detection of received data at two different types of network interfaces on the mobile communications device, before a set of the received data is permitted to proceed to its target destination with an operating system subsystem, gathering the received data and identifying a first communications protocol for a first subset of received data corresponding to a first type of network hardware interface and a second communications protocol for a second subset of received data corresponding to a second network hardware interface, the first and second types of protocols being different from each other;

performing a common classification analysis on at least a part of the received data from each of the two network hardware interfaces according to the determined first communications protocol and second communications protocol to determine a classification for the set of received data, the common security analysis including:

analyzing the first subset of received data formatted according to the first communications protocol using a first protocol analysis component, and analyzing the second subset of received data formatted according to the second communications protocol using a second protocol analysis component; and, using the determined classification for the set of received data to determine whether the set of received data should either be allowed to proceed to its target destination, or be prevented from proceeding to its target destination.

25. A method of performing a dynamic security analysis of a set of data being received on a mobile communications device, the method comprising:

on a mobile communications device having multiple network hardware interfaces for receiving data, when receiving the set of data using a first type of network hardware interface and using a second type of network hardware interface, the data being received using the first network hardware interface having a different communications protocol from the data being received using the second network hardware interface, gathering information about the set of data being received by the mobile communications device;

based upon the gathering step, assigning a first communications protocol to data being received using the first type of network hardware interface and assigning a second communications protocol to data being received using the second type of network hardware interface; and performing a common dynamic security analysis on a first subset of the set of data, the first subset assigned the first protocol, and on a second subset of the set of data, the second subset assigned the second protocol, to determine whether the set of data being received by the mobile communications device is safe or malicious, the common dynamic security analysis including:

analyzing the first subset while formatted according to the first communications protocol and using a first protocol analysis component, and analyzing the second subset while formatted according to the second communications protocol using a second protocol analysis component.

* * * * *